US006606105B1

(12) United States Patent
Quartetti

(10) Patent No.: US 6,606,105 B1
(45) Date of Patent: Aug. 12, 2003

(54) LAYER ENHANCEMENTS IN DIGITAL ILLUSTRATION SYSTEM

(75) Inventor: Chris Quartetti, East Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/470,014

(22) Filed: Dec. 22, 1999

(51) Int. Cl.[7] ................................. G09G 5/00
(52) U.S. Cl. ................. 345/853; 345/810; 345/835; 345/838; 345/841; 715/517; 715/502
(58) Field of Search ................. 345/700, 764, 345/810, 835, 838, 839, 841, 853, 854; 707/500, 502, 517, 526, 530

(56) References Cited

U.S. PATENT DOCUMENTS

| | | | | |
|---|---|---|---|---|
| 5,490,246 A | * | 2/1996 | Brotsky et al. | 345/763 |
| 5,491,795 A | * | 2/1996 | Beaudet et al. | 345/804 |
| 5,504,853 A | * | 4/1996 | Schuur et al. | 345/853 |
| 5,646,992 A | * | 7/1997 | Subler et al. | 705/53 |
| 5,666,503 A | * | 9/1997 | Campanelli et al. | 345/853 |
| 5,751,286 A | * | 5/1998 | Barber et al. | 345/835 |
| 6,097,389 A | * | 8/2000 | Morris et al. | 345/804 |
| 6,317,142 B1 | * | 11/2001 | Decoste et al. | 345/762 |
| 6,326,957 B1 | * | 12/2001 | Nathan et al. | 345/179 |
| 6,414,679 B1 | * | 7/2002 | Miodonski et al. | 345/420 |

OTHER PUBLICATIONS

Corel Corporation and Corel Corporation Limited, Graphics Suite CorelDraw 9 User Guide, Chapter 5, pp. 165–208, 1999, WordPerfect® and Corel VENTURA.

* cited by examiner

Primary Examiner—Kristine Kincaid
Assistant Examiner—Nhon D Nguyen
(74) Attorney, Agent, or Firm—Fish & Richardson P.C.

(57) ABSTRACT

Methods and apparatus, including computer program apparatus, implementing techniques for displaying information to a user of a system for editing documents containing digital artwork objects and for creating and editing such documents. The techniques include receiving a document containing a hierarchy of digital artwork elements; displaying the hierarchy to a user in a graphical representation including representations of elements; and displaying a corresponding thumbnail image with each of the displayed representations. Particular implementations include changing the displayed thumbnails as the corresponding artwork is edited so that the appearance of the thumbnails is synchronized with the appearance of the artwork. In another aspect, the techniques include implementing a capability to nest layers with layers. In another aspect, the techniques include implementing a release to layers command that expands an aggregation of artwork objects into separate editable objects and places each such separate object into a corresponding new layer in a graphics document. In particular implementations, the aggregation can be a blend, a scatter brush path, a container object, or a layer. The user can select the aggregation by selecting a row in a layers palette. In another aspect, the techniques include implementing a capability to drag and drop a group from a representation of the hierarchy to another position in the hierarchy and redefining the hierarchy according to the drag and drop.

39 Claims, 7 Drawing Sheets

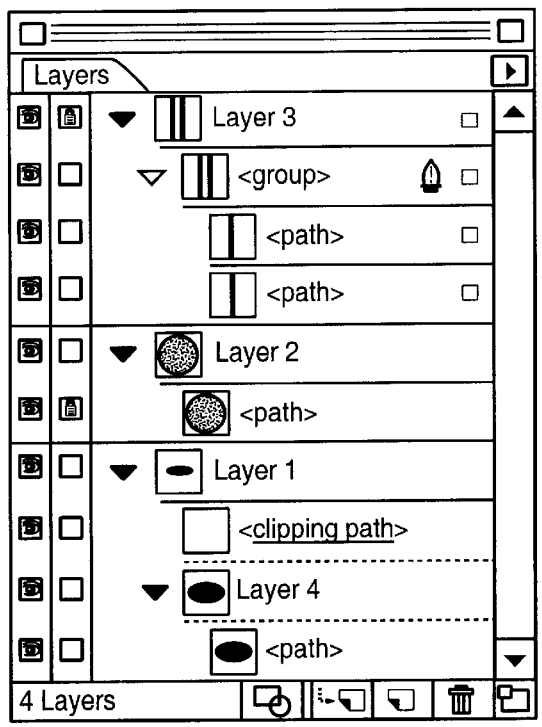
FIG._1
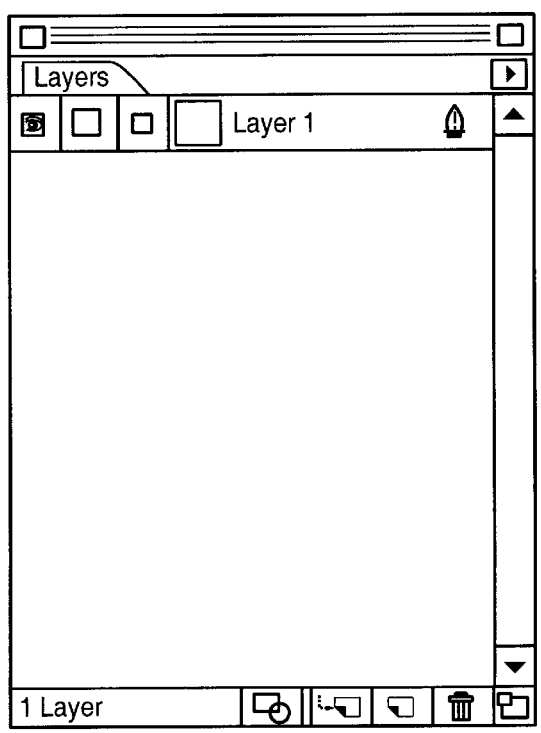
FIG._2
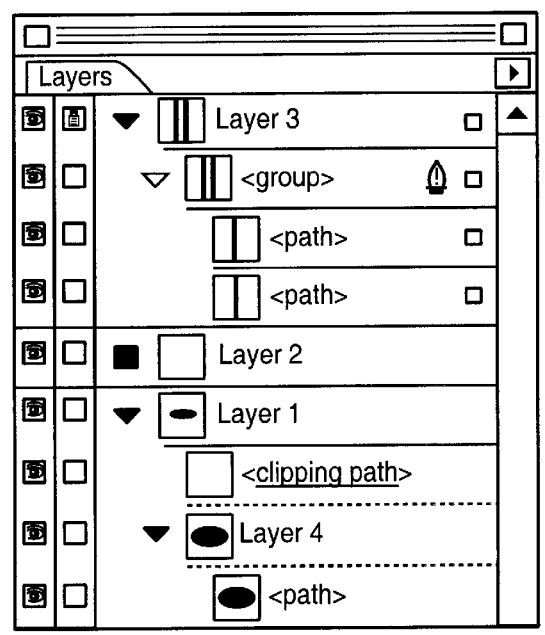
FIG._3

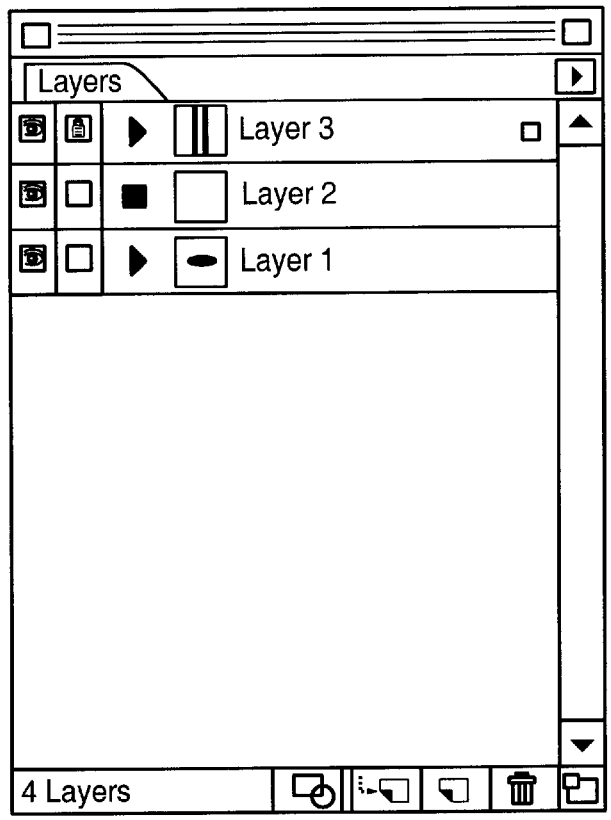
FIG._4
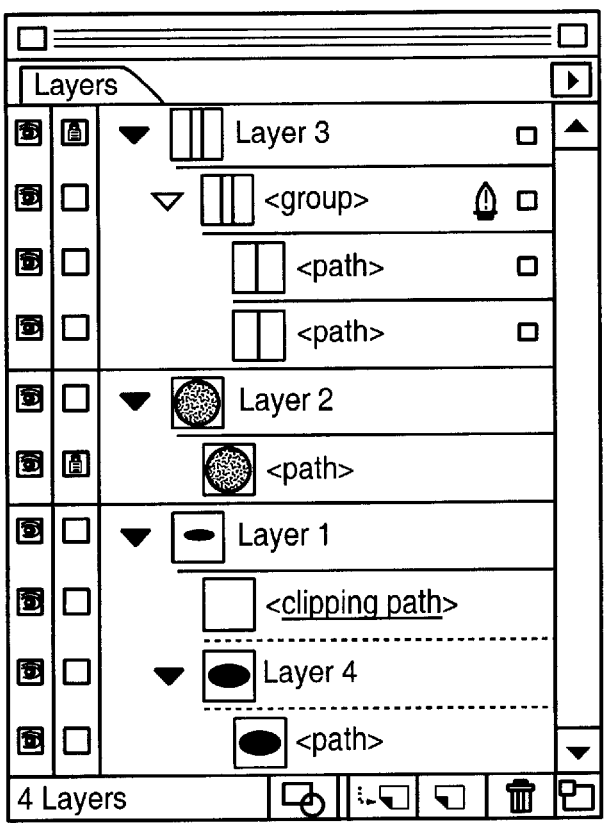
FIG._5

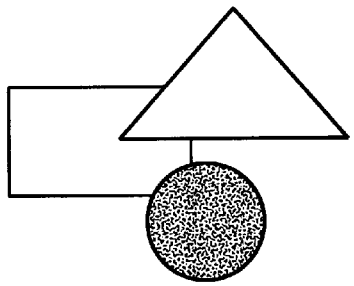
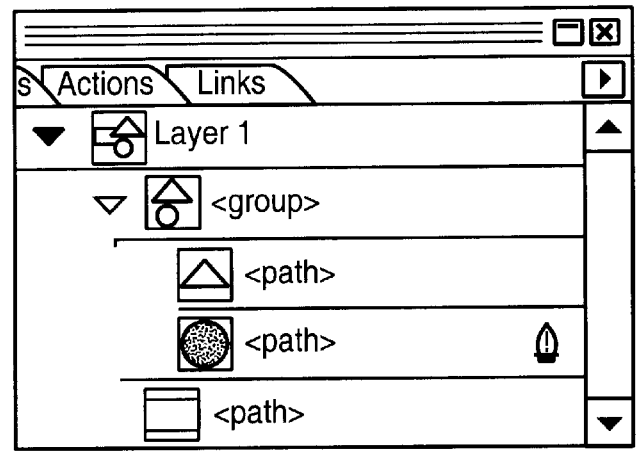
FIG._6A
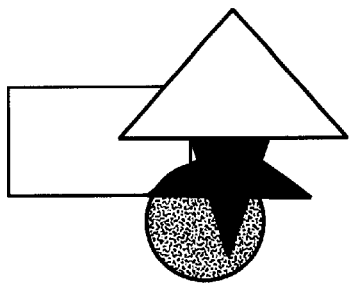
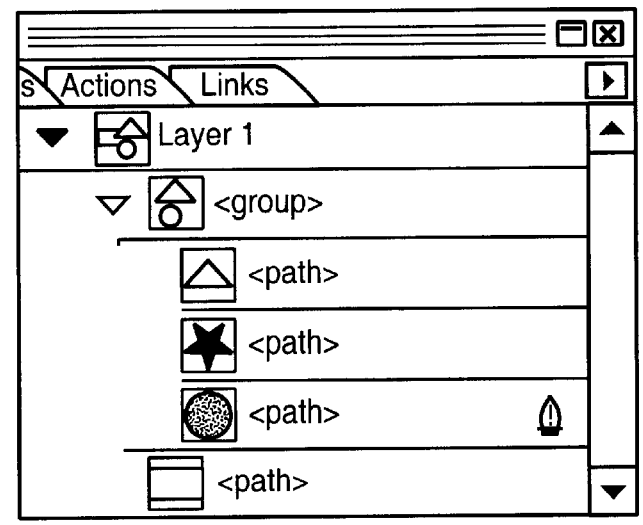
FIG._6B

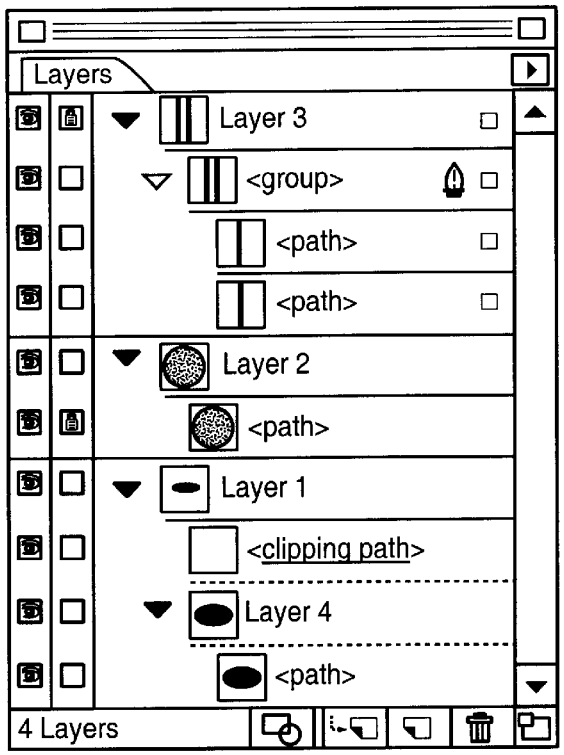
FIG._7
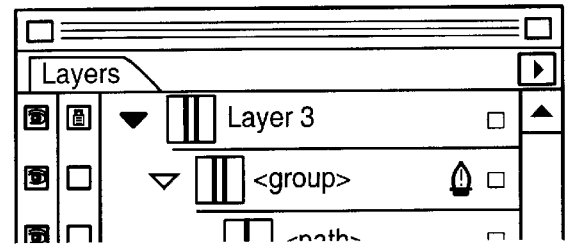
FIG._8
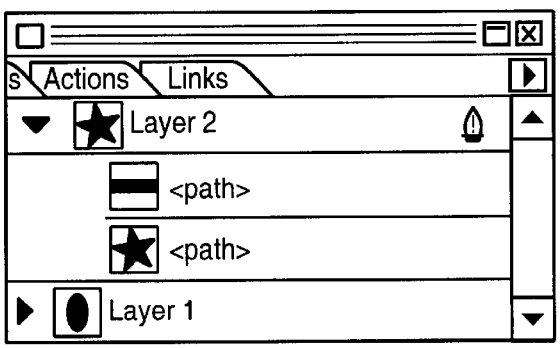
FIG._9A
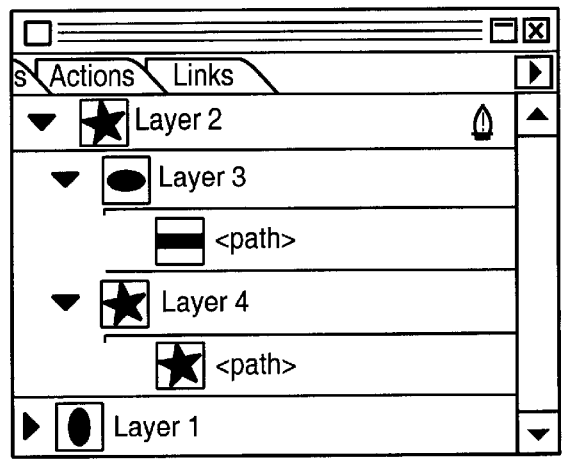
FIG._9B

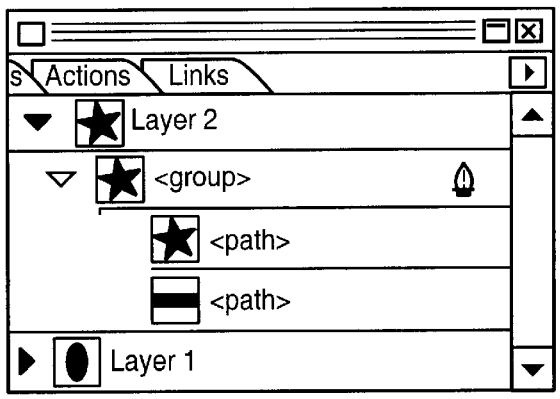
FIG._10A
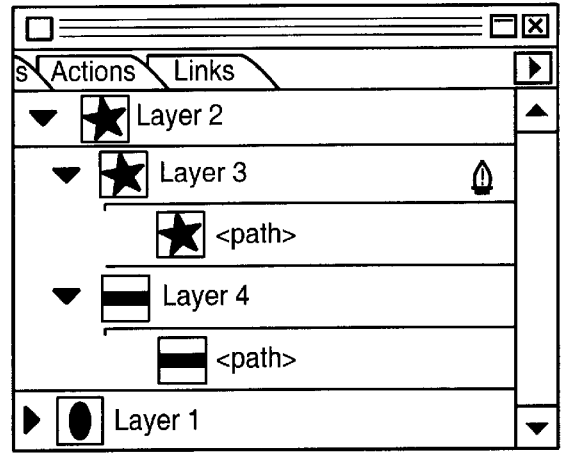
FIG._10B
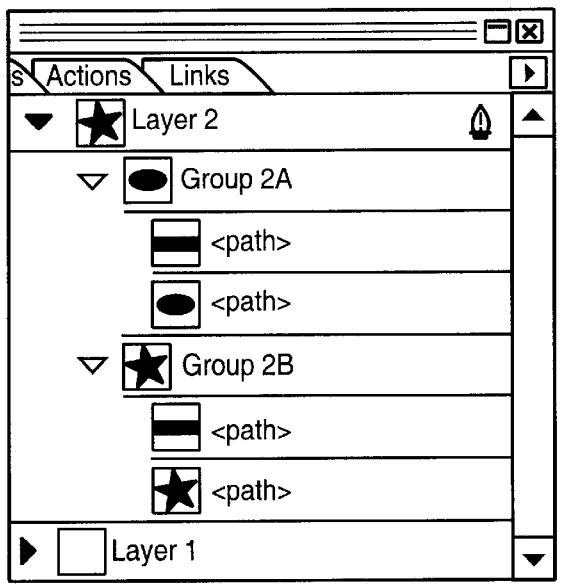
FIG._11A
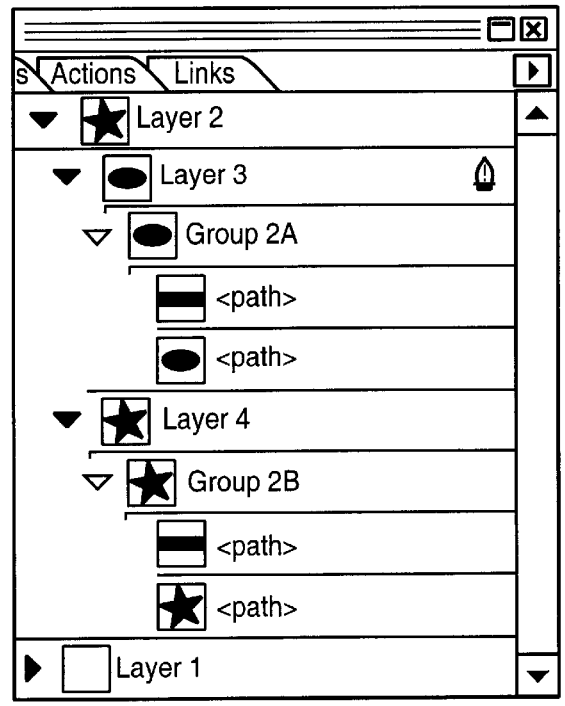
FIG._11B

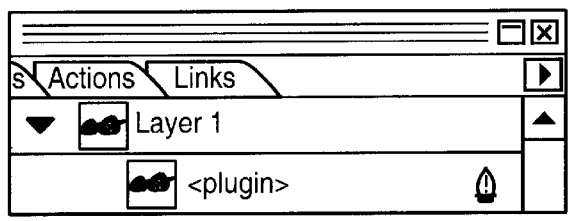
FIG._12A
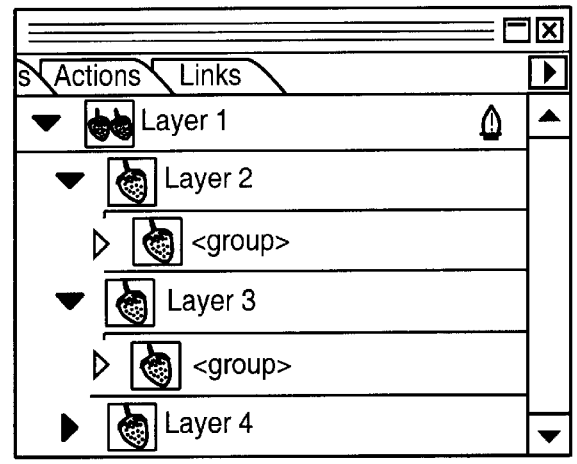
FIG._12B
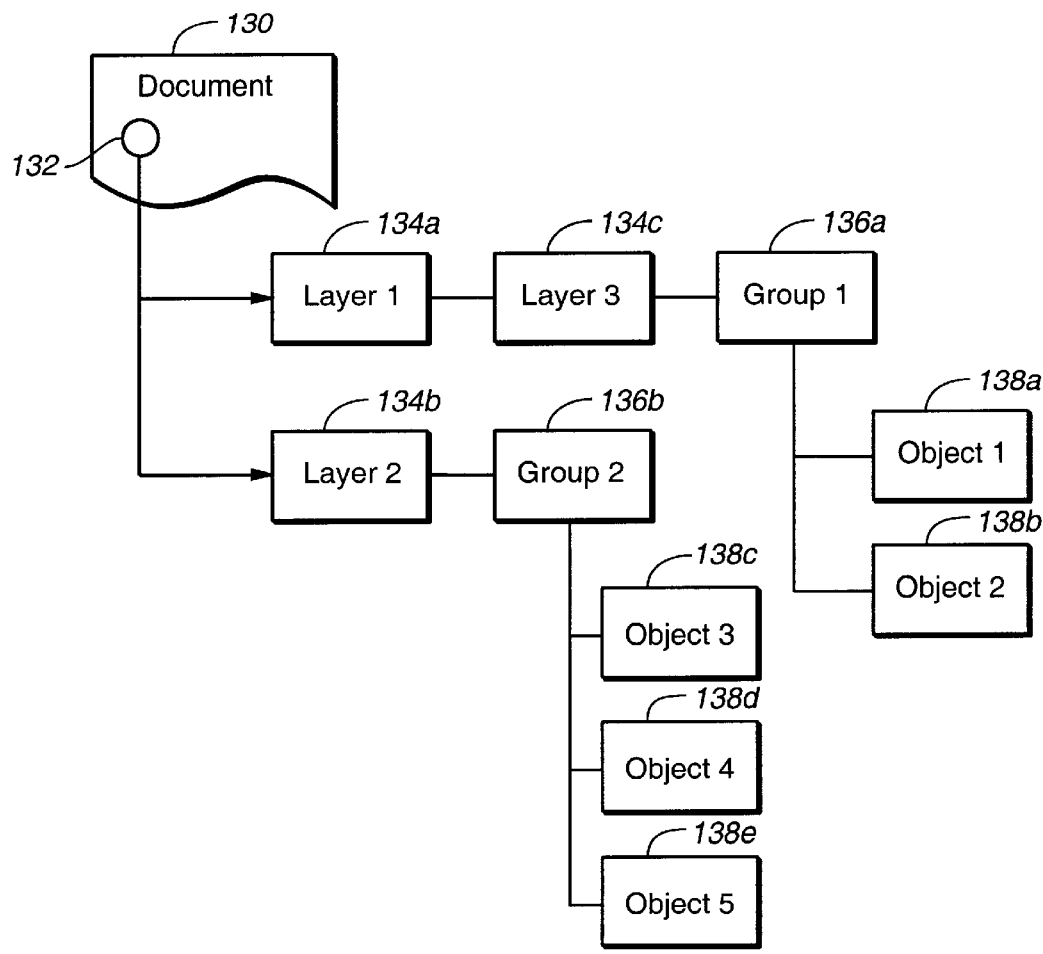
FIG._13

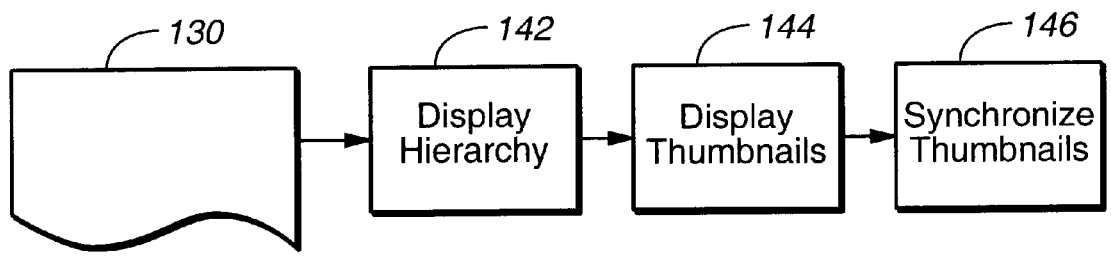
FIG._14
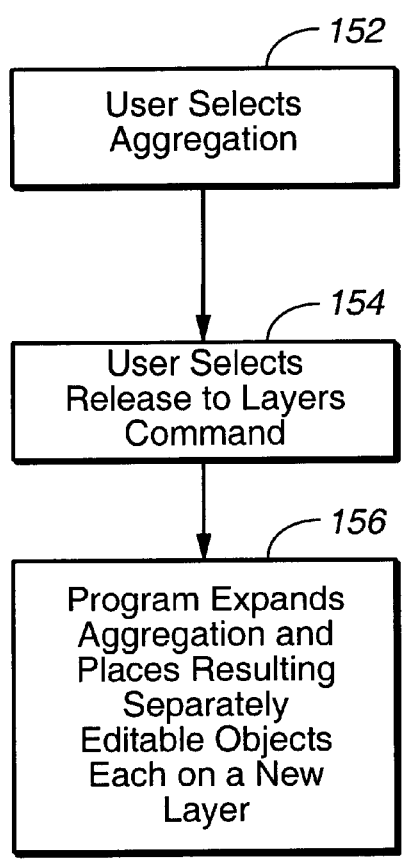
FIG._15
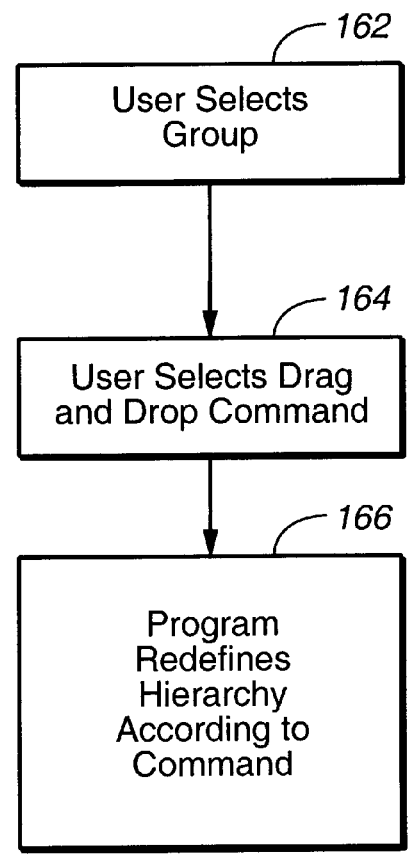
FIG._16

LAYER ENHANCEMENTS IN DIGITAL ILLUSTRATION SYSTEM

BACKGROUND

Two-dimensional computer-aided design and graphic arts programs, such as Adobe Illustrator®, available from Adobe Systems Incorporated of San Jose, Calif., generally allow users to organize their designs and artwork into layers, more or less analogous to sheets of acetate bound together. Each object on a layer has a stacking order such that objects can be on top of one another. Similarly, layers are also stacked on top of one another to form the final work.

Programs conventionally provide a layers palette to represent such layers, allowing the user to select the layer on which to draw, reorder the layers by dragging and dropping them with the mouse, and move art from one layer to another.

SUMMARY

The invention features methods and apparatus, including computer program apparatus, implementing techniques for displaying information to a user of a system for editing documents containing digital artwork objects, and for using the displayed information in editing such documents.

In general, in one aspect, the techniques include receiving a document containing a hierarchy of digital artwork elements, the hierarchy having at least three levels, the hierarchy including a first container, a second container, and a simple artwork object, the simple object being contained in the second container, the second container being contained in the first container; displaying the hierarchy to a user in a graphical representation including a representation of the first container, the second container, and the simple object; and displaying a corresponding thumbnail image with each of the first container, the second container, and the simple object, each thumbnail image being a small image of the corresponding artwork.

In general, in another aspect, the techniques include receiving a document containing a hierarchy of digital artwork elements, the hierarchy having a top level, the hierarchy requiring that the elements at the top level all be layers, the document having a first layer and a second layer; and nesting the second layer within the first layer.

In general, in another aspect, the techniques include receiving a user input selecting an aggregation of artwork elements; receiving a user input selecting a release to layers command on the selected group; and responding to the command by expanding the group into separate editable objects and placing each such separate editable object in a corresponding new layer in the document, a new layer being created for each of the objects.

In general, in another aspect, the techniques include displaying a graphical representation of a hierarchy of digital artwork elements of a document; receiving a user input selecting a group from the hierarchy, the group having a position in the hierarchy; receiving a user input dragging and dropping the group from the position to another position in the hierarchy; and redefining the hierarchy according to the user input dragging and dropping the group.

Advantages that may be seen in suitable implementations of the invention include one or more of the following. The user can see a graphic representation of the stacking, grouping, and other properties of objects within the layers of a graphics arts document. The user can readily see which object in the drawing corresponds to a particular layer or row in the layers palette by recognizing the appearance of the object in the document through a thumbnail image. The user can place and manage layers inside layers, which helps the user organize complex documents. The user gets an easy, precise way to move objects between groups and layers. The user can easily and automatically expand a blend or pattern brush into multiple layers for use in animation programs.

BRIEF DESCRIPTION OF THE DRAWINGS

FIG. 1 shows a layers palette in accordance with the invention.

FIG. 2 shows the layers palette in its initial state after a new document is created.

FIG. 3 shows the layers palette with thumbnails option set to "on all".

FIG. 4 shows the layers palette in a collapsed state.

FIG. 5 shows the layers palette in an expanded state.

FIGS. 6A and 6B show grouped objects and using the layers palette in editing.

FIG. 7 shows selection marks in the layers palette.

FIG. 8 shows the eye icon in preview mode.

FIGS. 9A and 9B show releasing objects in a layer to individual layers.

FIGS. 10A and 10B show releasing objects in a group to individual layers.

FIGS. 11A and 11B show releasing groups to individual layers.

FIGS. 12A and 12B show selecting layers in a scatter brush path.

FIG. 13 shows a document with a hierarchy of elements in accordance with the invention.

FIGS. 14, 15, and 16 each show a process flow in accordance with the invention.

DETAILED DESCRIPTION

The present invention provides a layers palette implemented in a computer program in accordance with the invention, and the related functionality of the computer program. The exemplary implementation is in a graphic arts program that is implemented to run as an application on a personal computer. As is conventional, the program allows a user to create and edit digital artwork that is stored a document or file on the computer. The user does so using a graphical user interface, which includes the layers palette.

As will be described later in more detail, the layers palette displays the contents or elements of a drawing file in a hierarchy of levels—layers, groups, and objects—and has the following attributes. Layers can be nested within layers. A clipping path (which will be described later) can be an element in hierarchy shown in the layers palette. The user can use the layers palette to reverse the order of layers and objects. The layers palette can list all of the layers in a program document or file. The layers palette graphically shows the stacking order of layers, groups, and objects in a hierarchical list view, and layers can be nested within layers.

For example, FIG. 1 graphically shows the stacking order and nesting of layers, groups, and objects in a hierarchical list view. The group of objects in Layer 3 are at the top of the hierarchy and stacking order. The contents of Layer 2 are on an intermediate layer, and the contents of Layer 1 are at the bottom of the stacking order. The top-most layer on the layers palette is always the front-most layer in the document. Conversely, the back-most layer is the bottom-most layer. Lastly, the example shows that Layer 4 is nested within Layer 1.

Layers and groups behave as containers for objects. The user can collapse and expand each individual container in the palette to show and hide its contents. Indentation indicates levels. The user can resize the palette to display expanded layers that are not visible.

FIG. 1 also illustrates the following features. The user can easily move objects from one layer to another. For example, the user can move the group of objects in Layer 3 to Layer 1 by dragging the group row in the palette and dropping it on the row for Layer 1. Layers, groups, and objects can have thumbnails. Layer 1 contains a clipping path, which clips the artwork items that are located below it in Layer 4. A clipping path is an object or group of objects whose shape is used to define a mask. A clipping path masks artwork so that only that portion of the artwork within the clipping path is visible through the shape of the clipping path. The layers palette reflects the current state of the active document. Thus, if thumbnails appear in the layers, they are updated as the image changes.

FIG. 2 show the layers palette for a new document after it is created.

The user can change the appearance of the layers palette by setting options in a Layers Palette Options dialog box. The row size option sets the size of the rows in the layers palette. The thumbnails option shows or hides thumbnails for layers, groups, or objects.

FIG. 3 shows a layers palette that has the thumbnails option set to the "on all" setting. Thumbnails are displayed on all layers, groups, and objects. This is a suitable default setting.

FIG. 4 shows the layers palette in its collapsed state. A colored square indicates that a layer has no contents.

FIG. 5 shows the layers palette in its expanded state. Although only a few layers are shown, there is no limit to the number of levels in the hierarchy. Only layers can exist at the top level of the hierarchy. Objects can exist only within layers and groups. In this context, the layer and group items are not objects, they are containers for objects. Groups and objects can exist only within layers, not separate from any layer. Layers cannot be located inside a group. Commands such as lock or hide that are applied to a layer or group container are also applied to the container's contents. Moving a layer or group container also moves all the container's contents. (What is referred to in this context simply as an "object" will, in other contexts, often be referred to as a "simple object", to distinguish it from container objects such as layers and groups.)

New layers can be created at any time. The user can create a new layer in many different ways, using predefined menu or keystroke-based commands. For example, with and without displaying a dialog window, the user can create or create and display new layer, create a new top layer, create a new layer below any selected item, create a new sublayer inside a selected layer, create a new sublayer inside a selected layer at the bottom of the contents stack, and duplicate a layer.

The user can use the layers palette to add an object to a group by doing the following steps:

1. Show all items of the group in the layers palette.
2. In the layers palette, select the existing object that the user wants immediately below the new object in the stacking order.
3. Draw the new object in the document.

FIGS. 6A and 6B illustrate the following example. If the user wants to add a dark blue star to the group shown in FIG. 6A, behind the yellow triangle but in front of the light blue circle, the user can first select the light blue circle in the layers palette. After the user draws the dark blue star, it is placed above the light blue circle in the artwork, and its row is placed in the group above the row for the light blue circle as shown in FIG. 6B.

When the user first creates a layer, group, or object, the program gives it a default name, which the user can change. The default names of both layers and sublayers are "Layer x," where x is a number starting with 1 that increments by 1 as each layer is created. Duplicated layers are named by appending "copy" to their names. For example, "Layer 1 copy". Duplicates of duplicates are named using the pattern "copy 2", "copy 3", and so on. The user can change the default naming scheme.

The program will, by default, create the following default names of groups, objects, and other items after each item is created.

| Item in Layers Palette | Default Name |
| --- | --- |
| group | "<group>" |
| object with a simple path | "<path>" |
| object with a compound path | "<compound path>" |
| blend | "<blend>" |
| pattern brush | "<pattern brush>" |
| mesh | "<mesh>" |
| clipping path | "<clipping path>" (underlined) |
| text object | Beginning portion of text contents |
| placed EPS file | "<placed>" |
| placed raster image | "<raster>" |
| objects that do not fit into any other category (such as graphs) | "<object>" |
| known plug-in | name that represents the plug-in |
| unknown plug-in | "<plugin>" |

In an optional implementation, the program creates a default name based on the attributes of an item, such as shape and color; "purple rectangle" is an example.

When the user creates a new sublayer under a parent layer, die default color of the sublayer is the same as that of the parent layer. The user can change the sublayer color later. If the user drags and drops an existing layer to become a sublayer under a parent layer, the sublayer retains its original color. (The color of a layer is used to associate visually items selected in a drawing, for example, with their corresponding layer or layers. Thus, for example, an object may be displayed with an orange bounding box after it is selected, to show that it is in the layer shown with an orange color in the layers palette.)

The most direct way to select a layer, group, or object in the layers palette is to click it.

FIG. 7 illustrates the following attributes of the layers palette. When one or more objects are selected in the artwork, a small square appears at the right of the selected object or objects and to the right of every layer and group that contains any of them, directly or indirectly. Disclosure triangles for a layer are filled with the layer's color. Disclosure triangles for groups are white.

The user controls whether an item (layer, group, or object) is displayed in the image of the document by using the eye icon in the layers palette, shown in FIG. 8. The user can show and hide a single item by clicking the eye icon. The user can also show and hide multiple items or all items by simple commands.

The user can move layers, groups, or objects in the stacking order by dragging them to other rows in the layers palette hierarchy. In addition, the program supports the following behaviors. Groups and objects have the same movement behaviors as layers. When a layer or group is moved, its contents are moved with it. Dragging a non-contiguous selection to a new location in the stack moves the layers to a single slot (that is, they are moved as if they were a contiguous selection). The user can use a Reverse Order command on the layers palette menu to reverse the stacking order of selected rows within the same parent. The selected rows can be either contiguous or non-contiguous.

The program uses different insertion lines to show the placement of an item (layer, group, or object) when the user drags and drops the item in the layers palette.

When the mouse is held down on an item and moved (or when it is held down for one second), a grabbing hand cursor appears, to indicate the item will be dragged. When the mouse is moved with the button down, a dithered black and white rectangle exactly the dimensions of the item (without dividing lines) is dragged with the cursor.

The program implements a Release to Layers command. This command creates a new layer for each element inside the selected element in the layers palette. In response to the command, the program creates a new layer for each object in the selected layer or group, and moves each object to its own individual layer. (In this context, elements like a blend and a scatter brush are considered a group; and, in fact, the command can be used with any art created and maintained by a plug-in as a plug-in group.) If the user had selected a layer, new individual layers are added as sublayers within the selected layer. If the user had selected a group, the new layers are added as sublayers of the group's or parent's layer, and the empty group container is deleted.

FIGS. 9A and 9B show how the Release to Layers command changes the hierarchy of a layer. In this example, Layer 2 is selected before the command is used (FIG. 9A). Two new sublayers are created (Layer 3 and Layer 4) and the two objects in Layer 2 are moved to those new sublayers (FIG. 9B).

FIGS. 10A and 10B show how the Release to Layers command changes the hierarchy of a group. In this example, the group is selected before the command is used (FIG. 10A). Two new sublayers are created (Layer 3 and Layer 4) and the two objects in the group are moved to those new sublayers (FIG. 10B). The sublayers are placed below Layer 2, and the group container is deleted.

FIGS. 11A and 11B show releasing groups to layers. In this example, Layer 2, which is the parent layer for Groups 2A and 2B, is selected before the Release to Layers command is used (FIG. 11A). Two new sublayers are created (Layer 3 and Layer 4) and the two groups are moved to those new sublayers (FIG. 11B). The sublayers are placed within Layer 2.

FIGS. 12A and 12B show how the Release to Layers command changes a scatter brush path to layers. The command places each of the elements of the scatter brush path on an individual layer. The original scatter brush pattern is not deleted. In this example, the user selects the scatter brush path shown in FIG. 12A. A scatter brush is a kind of pattern brush. It is a conventional tool that is used to place instances of art along a path, randomly scattered according to brush parameters. After the user uses the Release to Layers command on the selected scatter brush path, the program creates a group and new layer for each element of the scatter brush path (FIG. 12B). If two scatter brush paths are grouped and then the user releases the group to layers, the result is two layers, one for each path.

The Release to Layers command is an extension of a prior art "expand" command that makes each component a normally selectable art object. The Release to Layers command is equivalent to first expanding the object and then taking each resulting component and putting it on a separate layer.

If the user selects a blend in the layers palette before using the Release to Layers command, each of the paths in the blend is placed on an individual layer. A blend is a morph between two objects along a path. For example, the user can blend a red circle into a blue square. The result is a series of intermediate shapes gradually changing from a circle to square, red to blue. In a blend, the starting and ending shapes, as well as the path the blend follows, can be changed and the result will update automatically.

The program also implements a Collect in New Layer command. This command collects all of the selected layers, groups, or objects into a new layer. After this command is used, the new layer is placed above the top-most previously selected row. If the selected row is in a group, the new layer is placed above and outside the group, because layers cannot be in a group.

The layers palette traverses the hierarchy of the objects in a document. In the implementation that will be described, the objects are stored in a tree-like data structure that is represented graphically in a hierarchical list. Thumbnail images can be drawn for the contents of each row in the list. Which rows have thumbnails depends on options settings chosen by the user.

In order to keep the hierarchy list in synch with the art in the document, each element of the art tree that is represented in the layers palette is given a unique serial number in an document dictionary. As the list is built, this serial number is also stored as part of the list, so if the art is reordered in the document window, the layers palette detects this change and displays it correctly.

In order to save memory, a list is built only for expanded layers and groups. When the user clicks to expand a layer or group, the list is built on the fly. Similarly, when the user clicks to expand a layer or group, the no longer visible list entries are deallocated. However, the serial numbers in the art tree are retained for future use.

This is illustrated in the following example, in which object D is added to the art tree. After the object is added to the art tree, the layers palette receives an art change notification which causes it to resynchronize itself to the art tree. When it traverses the tree to object D it finds it has no serial number, which indicates it is new. A new serial number is generated and assigned to both a new entry in the hierarchy list and the object in the tree.

Hierarchy list before insertion of object D:

Layer 1 (#01)
   <group A>#02
     <object B>#03
     <object C>#04

Art tree before insertion of object D:

Layer 1(#01)
   <group A>#02
     <object B>#03
     <object C>#04

Art tree after insertion of object D:

Layer 1 (#01)
   <group A>#02
     <object B>#03
     <object D>
     <object C>#04

Hierarchy list after insertion of object D:
Layer 1 (#01)
    <group A>#02
        <object B>#03
        <object D>#05
        <object C>#04

Art tree after insertion of object D with new serial number assigned by layers palette:
Layer 1 (#01 )
    <group A>#02
        <object B>#03
        <object D>#05
        <object C>#04

The serial-numbers are also helpful when existing objects are rearranged.

Because it can be time consuming to draw thumbnail images, the process should be optimized. The following optimization techniques can be used. When the document is edited, the areas in which changes were made are compared to the areas covered by the thumbnails, and only those having an overlap are marked to be redrawn. Changes made during a short period of time, in the range of one to three seconds, for example, are allowed to accumulate before the thumbnails are redrawn. A thumbnail marked for redrawing is nevertheless displayed until a superseding thumbnail is drawn. And the user is given the option of disabling automatic redrawing or automatic redrawing of particular thumbnails.

FIG. 13 is a diagram showing a document 130 having a hierarchy 132 of digital artwork elements, represented in this example as a tree. The tree is four levels deep. The first level is composed of layers 134a and 134b; the second level, of layer 134c and group 136b; the third level, of group 136a and objects 138c, 138d, and 138e; and the fourth level, of objects 138a and 138b.

FIG. 14 shows a flow of processing on the document 130 by a program in accordance with the invention. The program displays the hierarchy (step 142), displays thumbnails as described earlier (step 144), and maintains the displayed thumbnails (as well as other palette elements) in synchronization with the document 130 (step 146). For example, the layers palette shows other attributes such as name; selected, hidden and locked status. Synchronization goes in the other direction as well, because if the user chooses to delete or move a row, for example, the corresponding element in the document is modified accordingly.

FIG. 15 shows another process. A user using a program for editing an artwork document in accordance with the invention selects and aggregation (step 152) including artwork objects. The user selects a release to layers command (step 154). The program in response expands the aggregation and places each of the resulting separately-editable objects on a separate new layer in the document.

FIG. 16 shows a similar process. The user selects a group (step 162) and a drag and drop command (step 164), by manipulating a pointer and button in a graphical user interface, for example. The program in response redefines the hierarchy of the document according to where the selected group was dropped by the user.

The invention can be inplemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method for displaying information to a user of a system for editing documents containing digital artwork objects, comprising:

receiving a document containing a hierarchy of digital artwork elements, the hierarchy having at least three levels, the hierarchy including a first container, a second container, and a simple artwork object, the simple object being contained in the second container, the second container being contained in the first container, the hierarchy representing a stacking order of the digital artwork elements defining the appearance of the document;

displaying the hierarchy to a user in a graphical representation including a representation of the first container, the second container, and the simple object; and displaying a corresponding thumbnail image with each of the first container, the second container, and the simple object, each thumbnail image being a small image of the corresponding artwork.

2. The method of claim 1, further comprising:

changing the displayed thumbnails as the corresponding artwork is edited so that the appearance of the thumbnails is synchronized with the appearance of the artwork.

3. A method for displaying information to a user of a system for editing documents containing digital artwork objects, comprising:

receiving a document containing a hierarchy of digital artwork elements, the hierarchy having a top level, the hierarchy requiring that the elements at the top level all be layers, the document having a first layer and a second layer, the hierarchy representing a stacking order of the digital artwork elements defining the appearance of the document; and nesting the second layer within the first layer.

4. The method of claim 3, wherein the first layer is below the top level of the hierarchy.

5. A method for editing a digital artwork document, comprising:

receiving a user input selecting an aggregation of artwork elements;

receiving a user input selecting a release to layers command on the selected aggregation; and in response to the command, expanding the selected aggregation into separate editable objects and placing each such separate editable object in a corresponding new layer in the document, a new layer being created for each of the objects.

6. The method of claim 5, wherein the aggregation is a blend.

7. The method of claim 5, wherein the aggregation is a scatter brush path.

8. The method of claim 5, wherein the aggregation is a container object.

9. The method of claim 5, wherein the aggregation is a layer.

10. The method of claim 5, wherein the aggregation is created by a plug-in filter or group.

11. The method of claim 5, wherein the user input selecting an aggregation is a user input selecting a row in a layers palette.

12. A method for editing a digital artwork document, the document containing a hierarchy of digital artwork elements, the method comprising:

displaying a graphical representation of a hierarchy of digital artwork elements of a document, the hierarchy representing a stacking order of the digital artwork elements defining the appearance of the document;

receiving a user input selecting a group from the hierarchy, the group having a position in the hierarchy;

receiving a user input dragging and dropping the group from the position to another position in the hierarchy; and redefining the hierarchy according to the user input dragging and dropping the group and thereby redefining the appearance of the document.

13. The method of claim 12, wherein the selected group is dropped within a second group.

14. A system for displaying information to a user of a system for editing documents containing digital artwork objects, comprising:

means for receiving a document containing a hierarchy of digital artwork elements, the hierarchy having at least three levels, the hierarchy including a first container, a second container, and a simple artwork object, the simple object being contained in the second container, the second container being contained in the first container, the hierarchy representing a stacking order of the digital artwork elements defining the appearance of the document;

means for displaying the hierarchy to a user in a graphical representation including a representation of the first container, the second container, and the simple object; and means for displaying a corresponding thumbnail image with each of the first container, the second container, and the simple object, each thumbnail image being a small image of the corresponding artwork.

15. The system of claim 14, further comprising:

means for changing the displayed thumbnails as the corresponding artwork is edited so that the appearance of the thumbnails is synchronized with the appearance of the artwork.

16. A system for editing documents containing digital artwork objects, comprising:

means for receiving a document containing a hierarchy of digital artwork elements, the hierarchy having a top level, the hierarchy requiring that the elements at the top level all be layers, the document having a first layer and a second layer, the hierarchy representing a stacking order of the digital artwork elements defining the appearance of the document; and means for nesting the second layer within the first layer.

17. The system of claim 16, wherein the first layer is below the top level of the hierarchy.

18. A system for editing a digital artwork document, comprising:

means for receiving a user input selecting an aggregation of artwork elements;

means for receiving a user input selecting a release to layers command on the selected aggregation; and means operable in response to the command for expanding the selected aggregation into separate editable objects and placing each such separate editable object in a corresponding new layer in the document, a new layer being created for each of the objects.

19. The system of claim 18, wherein the aggregation is a blend.

20. The system of claim 18, wherein the aggregation is a scatter brush path.

21. The system of claim 18, wherein the aggregation is a container object.

22. The system of claim 18, wherein the aggregation is a layer.

23. The system of claim 18, wherein the aggregation is created by a plug-in filter or group.

24. The system of claim 18, wherein the user input selecting an aggregation is a user input selecting a row in a layers palette.

25. A system for editing a digital artwork document, the document containing a hierarchy of digital artwork elements, the system comprising:

means for displaying a graphical representation of a hierarchy of digital artwork elements of a document, the hierarchy representing a stacking order of the digital artwork elements defining the appearance of the document;

means for receiving a user input selecting a group from the hierarchy, the group having a position in the hierarchy;

means for receiving a user input dragging and dropping the group from the position to another position in the hierarchy; and means for redefining the hierarchy according to the user input dragging and dropping the group and thereby redefining the appearance of the document.

26. The system of claim 25, wherein the selected group is dropped within a second group.

27. A computer program product, tangibly stored on a computer-readable medium, for displaying information to a user editing documents containing digital artwork objects, comprising instructions operable to cause a programmable processor to:

receive a document containing a hierarchy of digital artwork elements, the hierarchy having at least three levels, the hierarchy including a first container, a second container, and a simple artwork object, the simple object being contained in the second container, the second container being contained in the first container, the hierarchy representing a stacking order of the digital artwork elements defining the appearance of the document;

display the hierarchy to a user in a graphical representation including a representation of the first container, the second container, and the simple object; and display a corresponding thumbnail image with each of the first container, the second container, and the simple object, each thumbnail image being a small image of the corresponding artwork.

28. The product of claim 27, further comprising instructions to:

change the displayed thumbnails as the corresponding artwork is edited so that the appearance of the thumbnails is synchronized with the appearance of the artwork.

29. A computer program product, tangibly stored on a computer-readable medium, for editing documents containing digital artwork objects, comprising instructions operable to cause a programmable processor to:

receive a document containing a hierarchy of digital artwork elements, the hierarchy having a top level, the hierarchy requiring that the elements at the top level all be layers, the document having a first layer and a second layer, the hierarchy representing a stacking order of the digital artwork elements defining the appearance of the document; and nest the second layer within the first layer.

30. The product of claim 29, wherein the first layer is below the top level of the hierarchy.

31. A computer program product, tangibly stored on a computer-readable medium, for editing a digital artwork document, comprising instructions operable to cause a programmable processor to:

receive a user input selecting an aggregation of artwork elements;

receive a user input selecting a release to layers command on the selected aggregation; and respond to the command by expanding the selected aggregation into separate editable objects and placing each such separate editable object in a corresponding new layer in the document, a new layer being created for each of the objects.

32. The product of claim 31, wherein the aggregation is a blend.

33. The product of claim 31, wherein the aggregation is a scatter brush path.

34. The product of claim 31, wherein the aggregation is a container object.

35. The product of claim 31, wherein the aggregation is a layer.

36. The product of claim 31, wherein the aggregation is created by a plug-in filter or group.

37. The product of claim 31, wherein the user input selecting an aggregation is a user input selecting a row in a layers palette.

38. A computer program product, tangibly stored on a computer-readable medium, for editing a digital artwork document, the document containing a hierarchy of digital artwork elements, the product comprising instructions operable to cause a programmable processor to:

display a graphical representation of a hierarchy of digital artwork elements of a document, the hierarchy representing a stacking order of the digital artwork elements defining the appearance of the document;

receive a user input selecting a group from the hierarchy, the group having a position in the hierarchy;

receive a user input dragging and dropping the group from the position to another position in the hierarchy; and redefine the hierarchy according to the user input dragging and dropping the group and thereby redefine the appearance of the document.

39. The product of claim 38, wherein the selected group is dropped within a second group.

* * * * *